(12) United States Patent
Kuriyama et al.

(10) Patent No.: US 9,663,147 B2
(45) Date of Patent: May 30, 2017

(54) VEHICLE BODY FRONT STRUCTURE OF A VEHICLE

(71) Applicant: TOYOTA JIDOSHA KABUSHIKI KAISHA, Toyota-shi (JP)

(72) Inventors: Tomoyuki Kuriyama, Toyota (JP); Kosuke Sakakibara, Toyota (JP); Masanobu Ohmi, Kasugai (JP); Akihiro Tamaoki, Tajimi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/900,947

(22) PCT Filed: Jun. 27, 2014

(86) PCT No.: PCT/IB2014/001204
§ 371 (c)(1),
(2) Date: Dec. 22, 2015

(87) PCT Pub. No.: WO2014/207544
PCT Pub. Date: Dec. 31, 2014

(65) Prior Publication Data
US 2016/0152273 A1 Jun. 2, 2016

(30) Foreign Application Priority Data

Jun. 28, 2013 (JP) .................................. 2013-137430

(51) Int. Cl.
*B62D 21/00* (2006.01)
*B62D 21/15* (2006.01)
(Continued)

(52) U.S. Cl.
CPC ............ *B62D 21/152* (2013.01); *B60R 19/34* (2013.01); *B62D 25/08* (2013.01)

(58) Field of Classification Search
CPC ...... B62D 21/152; B62D 25/08; B60R 21/152
(Continued)

(56) References Cited

U.S. PATENT DOCUMENTS

2004/0195862 A1 10/2004 Saeki
2012/0248820 A1 10/2012 Yasui et al.
(Continued)

FOREIGN PATENT DOCUMENTS

EP 2 514 656 A1 10/2012
JP 2000-062551 A 2/2000
(Continued)

*Primary Examiner* — Joseph D Pape
(74) *Attorney, Agent, or Firm* — Oblon, McClelland, Maier & Neustadt, L.L.P.

(57) ABSTRACT

In a vehicle body front structure, a collision load is input to an outside protruding portion of a gusset when a portion farther to a vehicle width direction outside than a front side member of a vehicle collides in a frontal collision with a colliding object (here, barrier (B)) such as an oncoming vehicle (i.e., when a so-called small overlap collision occurs). This gusset is fixed in a cross section of a front portion of the front side member, so the collision load is able to be better transmitted to a vehicle width direction inside portion of the front side member. Moreover, this gusset abuts against a front end portion of the outer panel of the front side member from a vehicle front side, so the collision load is also able to be better transmitted to a vehicle width direction outside portion of the front side member.

7 Claims, 7 Drawing Sheets (51) Int. Cl.
*B60R 19/34* (2006.01)
*B62D 25/08* (2006.01)

(58) Field of Classification Search
USPC .......................... 296/187.09, 187.1; 293/133
See application file for complete search history.

(56) References Cited

U.S. PATENT DOCUMENTS

| | | |
|---|---|---|
| 2012/0256446 A1 | 10/2012 | Yasuhara et al. |
| 2014/0091585 A1* | 4/2014 | Ramoutar ............... B60R 19/24 293/133 |
| 2014/0103670 A1 | 4/2014 | Iijima et al. |

FOREIGN PATENT DOCUMENTS

| | | |
|---|---|---|
| JP | 2003-48498 A | 2/2003 |
| JP | 2004-256059 A | 9/2004 |
| JP | 2006-137373 A | 6/2006 |
| JP | 2012-214211 A | 11/2012 |
| JP | 2012-236547 A | 12/2012 |
| WO | WO 2012/156794 A1 | 11/2012 |

* cited by examiner

VEHICLE BODY FRONT STRUCTURE OF A VEHICLE

BACKGROUND OF THE INVENTION

1. Field of the Invention

The invention relates to vehicle body front structure of a vehicle.

2. Description of Related Art

With a vehicle body front structure described in Japanese Patent Application Publication No. 2012-214211 (JP 2012-214211 A), a branch frame extends outward at an angle toward the front of a vehicle from a center portion of a front side frame in the vehicle longitudinal direction. A rear end portion of this branch frame that passes through an outside surface of the front side frame in the vehicle width direction extends toward a rear side of the vehicle along an inner wall of the front side frame. By providing this kind of branch frame, impact energy is effectively absorbed when a narrow offset collision (i.e., a small overlap collision), in which a colliding object such as an oncoming vehicle collides in a frontal collision with the vehicle in a position farther to the vehicle width direction outside than the front side frame of the vehicle, occurs.

However, with the vehicle body front structure described above, a vehicle width direction outside wall of a rear half portion of the front side frame, and a vehicle width direction outside wall of the branch frame are formed by a common second side plate. This second side plate is bent at a weak portion formed on a connecting portion of the front side frame and the branch frame, so rigidity with respect to a collision load from the vehicle front side is low, and consequently the second side plate may not sufficiently contribute to the transmission of the collision load from the branch frame to the front side member. Therefore, there is room for improvement from the viewpoint of efficiently transmitting, to the front side member, a collision load that is input from the vehicle front side to the vehicle width direction outside of the front side member.

SUMMARY OF THE INVENTION

The invention thus provides a vehicle body front structure of a vehicle that efficiently transmits, to a front side member, a collision load input from a vehicle front side to a portion of a vehicle body front structure that is farther to a vehicle width direction outside than the front side member.

A first aspect of the invention relates to a vehicle body front structure that includes a front side member that extends in a vehicle longitudinal direction on a side portion of a vehicle body front portion, and in which an outside open portion that is open toward a vehicle width direction outside is formed on a front portion; and a load transmitting member that is fixed in a cross section of the front portion of the front side member, and has an outside protruding portion that passes through the outside open portion and protrudes toward the vehicle width direction outside of the front side member, the load transmitting member abutting against a side wall on the vehicle width direction outside of the front side member from a vehicle front side.

With the vehicle body front structure of a vehicle according to this aspect, a collision load is input to the outside protruding portion of the load transmitting member when a colliding object such as an oncoming vehicle collides in a frontal collision with the vehicle in a position farther toward the vehicle width direction outside than the front side frame of the vehicle body front portion. This load transmitting member is fixed in the cross section of the front portion of the front side member, and the outside protruding portion passes through the outside open portion formed on the front portion of the front side member and protrudes toward the vehicle width direction outside of the front side member. In this way, the load transmitting member is fixed in the cross section of the front side member, so the collision load is able to be better transmitted to the vehicle width direction inside portion of the front side member. Moreover, this load transmitting member abuts against the side wall on the vehicle width direction outside of the front side member from the vehicle front side, so the collision load is also able to be better transmitted to the vehicle width direction outside portion of the front side member. As a result, according to the invention, the collision load input from the vehicle front side to a portion of the vehicle body front portion that is farther to the vehicle width direction outside than the front side member is able to be efficiently transmitted to the front side member.

The front side member of this aspect may have an inner panel with an open sectional shape that is open toward the vehicle width direction outside when viewed from the vehicle longitudinal direction, and an outer panel that is connected to the vehicle width direction outside of the inner panel. Also, the outside open portion may be formed by a front end portion of the outer panel being positioned farther to a vehicle rear than a front end portion of the inner panel, and the front end portion of the outer panel may abut against a rear surface of the load transmitting member that is fixed in a cross section of the inner panel.

With the vehicle body front structure of a vehicle having this structure, the front side member having the outside open portion formed on the front portion is able to be easily formed. Also, a conventional inner panel can be used for the inner panel of the front side member, so the manufacturing cost is able to be reduced, and productivity is able to be improved.

The load transmitting member in the aspect described above may have an inside fixed portion that is fixed to a side wall on a vehicle width direction inside of the front side member.

With the vehicle body front structure of a vehicle having this structure, the load transmitting member abuts against the vehicle width direction outside wall of the front side member from the vehicle front side, and has the inside fixed portion that is fixed to the side wall on the vehicle width direction inside of the front side member. As a result, the collision load that is input to the outside protruding portion of the load transmitting member is able to be better transmitted to the wall portion on both sides in the vehicle width direction of the front side member, so the efficiency with which the collision load is transmitted to the front side member is able to be effectively improved.

A rear surface of the load transmitting member in the aspect described above may be inclined toward a vehicle rear side farther toward the vehicle width direction inside.

With the vehicle body front structure of a vehicle having this structure, when the front side member bends toward the vehicle width direction inside due to a collision load that is input to the outside protruding portion of the load transmitting member, the rear end of the load transmitting member is the starting point of this bending. With the vehicle body front structure of a vehicle having this structure, the load transmitting member is able to be inhibited from becoming larger, even when the rear end of the load transmitting member is arranged farther to the vehicle rear side, and the bending portion of the front side member abuts against a power unit or the like.

The vehicle body front structure of a vehicle in the aspect described above may also include a bumper reinforcement that extends in the vehicle width direction on a front end portion of a vehicle body; and a crush box that is formed weaker in the vehicle longitudinal direction than the front side member, and connects the front side member to the bumper reinforcement, and on which an outside extending portion that is positioned in front of the outside protruding portion in the vehicle longitudinal direction is provided.

With the vehicle body front structure of a vehicle having this structure, the crush box that connects the front side member to the bumper reinforcement has the outside extending portion positioned in front of the outside protruding portion of the load transmitting member in the vehicle longitudinal direction. That is, the crush box extends toward the vehicle width direction outside, so when the collision load from the vehicle front side is input to a portion of the bumper reinforcement that is farther to the vehicle width direction outside than the front side member, the impact energy is able to be effectively absorbed by the deformation of the crush box. Also, a collision load is able to be efficiently transmitted to the outside protruding portion of the load transmitting member via the outside extending portion of the crush box.

As described above, the vehicle body front structure of a vehicle according to the aspect of the invention makes it possible to efficiently transmit, to a front side member, a collision load input from a vehicle front side to a portion of a vehicle body front portion that is farther to a vehicle width direction outside than the front side member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle body front structure 10 of a vehicle (hereinafter, simply referred to as "vehicle body front structure 10") according to one example embodiment of the invention will be described with reference to FIGS. 1 to 8. In the drawings, arrow FR indicates a forward direction (advancing direction) with respect to a vehicle body, arrow UP indicates an upward direction with respect to the vehicle body, and arrow OUT indicates an outside in a vehicle width direction. Hereinafter, unless otherwise specific, the directions of front and rear, up and down, and left and right in the description will refer to front and rear in the vehicle longitudinal direction, up and down in the vehicle vertical direction, and left and right when the vehicle is facing in the advancing direction, respectively.

Figure 1:
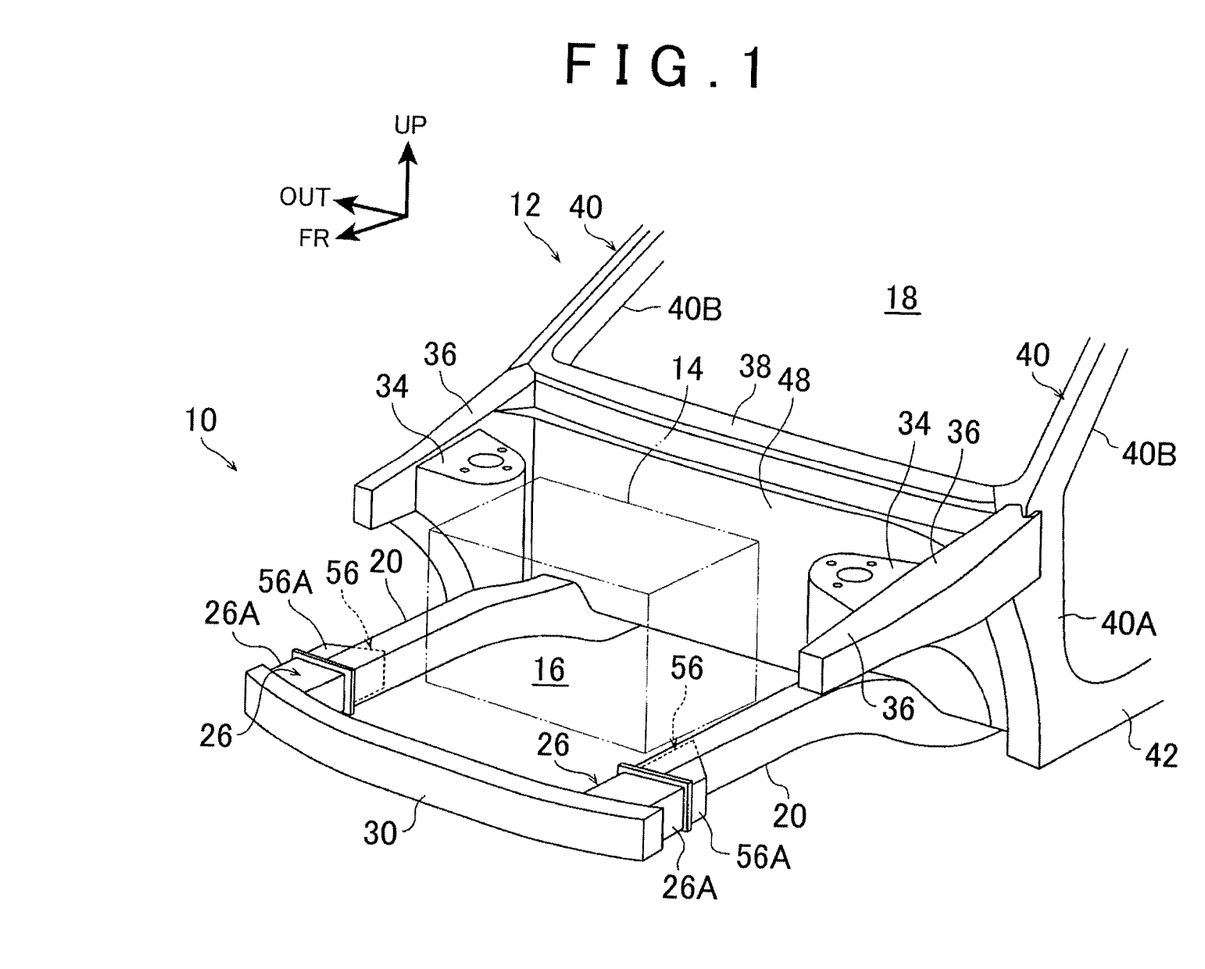
FIG. 1 is a perspective view of the structure of the main portion of a vehicle body front portion formed by a vehicle body front structure of a vehicle according to one example embodiment of the invention being applied.
Figure 2:
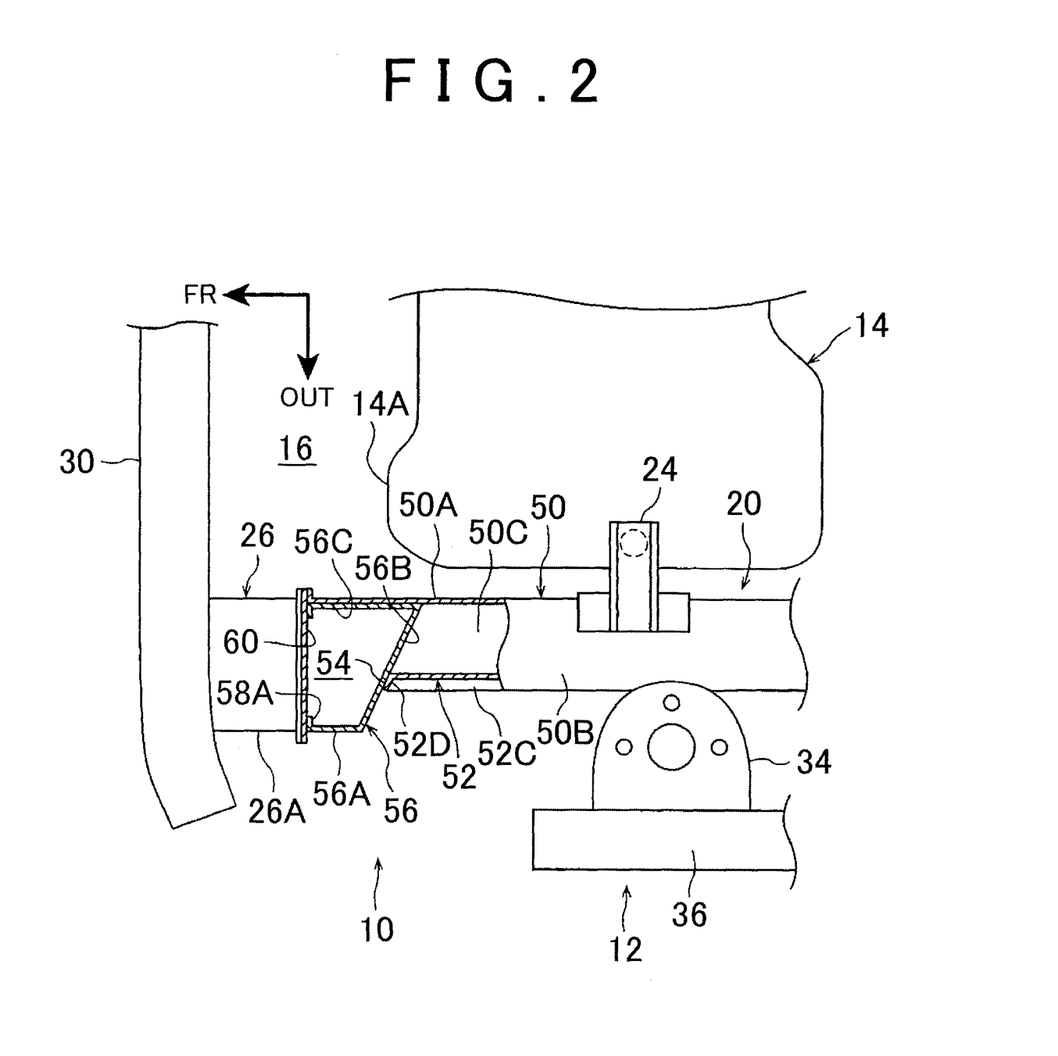
FIG. 2 is a partial sectional view of a portion of the structure shown in FIG. 1, viewed from a vehicle upper side.
Figure 3:
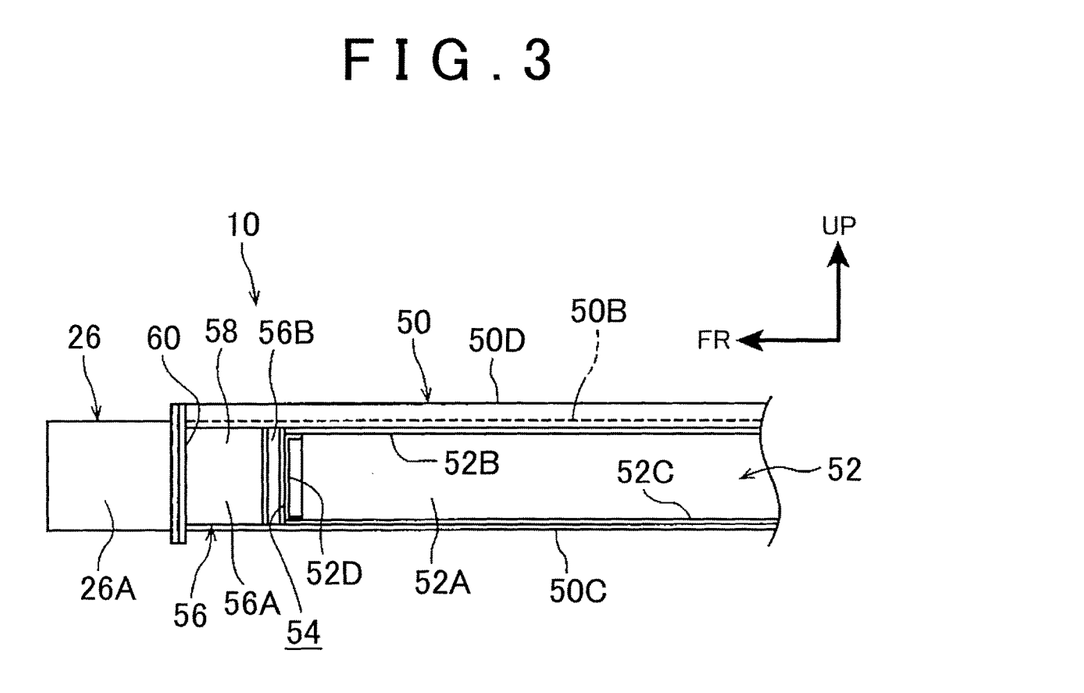
FIG. 3 is a side sectional view of a portion of the structure shown in FIG. 1, viewed from a vehicle width direction outside.

As shown in FIG. 1, a vehicle 12 to which the vehicle body front structure 10 is applied is a sedan-type vehicle, for example. This vehicle 12 has an engine compartment 16 formed in a vehicle body front portion to a vehicle front side of a cabin 18 (a vehicle interior). A power unit 14 that includes an engine or an electric motor or the like is housed in this engine compartment 16. A pair of left and right front side members 20 (see FIGS. 2 and 3) are provided one on each side in the vehicle width direction at a lower portion of the engine compartment 16. The vehicle body front structure 10 is formed basically bilaterally symmetrical, so the vehicle body right side is omitted in all of the drawings except for FIG. 1.

The left and right front side members 20 are frame members of a vehicle body that are formed with a rectangular closed sectional shape when viewed from the vehicle longitudinal direction, and are arranged one on each side of the vehicle body front portion, with the vehicle longitudinal direction being the length direction. An engine mount 24 (omitted from all of the drawings except for FIGS. 2 and 6) is attached to an upper surface of each of the left and right front side members 20. The power unit 14 is supported by the left and right front side members 20 via the engine mounts 24.

A crush box 26 (an impact absorbing member) is fixed by means such as bolt fastening via a gusset 56, that will be described later, to a front end portion of both the left and right front side members 20. Also, a bumper reinforcement 30 (not shown in FIG. 3) is fixed by means such as bolt fastening to a front end portion of each of these crush boxes 26. That is, the bumper reinforcement 30 extends between the front end portions of the left and right crush boxes 26, and the bumper reinforcement 30 is connected to the left and right front side members 20 via the left and right crush boxes 26.

The left and right crush boxes 26 are each formed in a rectangular closed sectional shape when viewed from the vehicle longitudinal direction, for example. Also, the rigidity (i.e., strength) of the left and right crush boxes 26 with respect to an axial compression load in the vehicle longitudinal direction is set lower than the rigidity (i.e., strength) of the front side members 20. That is, these crush boxes 26 are formed weaker than the front side members 20 in the vehicle longitudinal direction, such that when the vehicle 12 is involved in a frontal collision, they will absorb the energy by deforming before the front side members 20 deform.

The bumper reinforcement 30 is a so-called B-type cross-section type in which a sectional shape when viewed from the vehicle width direction is formed in a general B-shape, for example, and extends in the vehicle width direction at a front end portion of the vehicle body. An absorber (cushioning material), not shown, made of foam or the like is attached to a front end surface of this bumper reinforcement 30, and the absorber and the bumper reinforcement 30 are covered by a bumper cover, not shown.

Also, a pair of left and right suspension towers 34 (not shown in FIG. 3) are provided on a vehicle upper side of the left and right front side members 20, on both side portions in the vehicle width direction of the engine compartment 16. Lower end portions of the left and right suspension towers 34 are connected to the left and right front side members 20, respectively. The left and right suspension towers 34 support an upper portion of a suspension system, not shown. Suspension arms provided in this suspension system are supported by suspension members, not shown, that are attached to a lower surface of each of the left and right front side members 20.

Also, upper end portions of the left and right suspension towers 34 are connected to left and right apron upper members 36 (not shown in FIG. 3) that extend in the vehicle longitudinal direction on the vehicle upper side and the vehicle width direction outside of the left and right front side members 20. Rear end portions of the left and right apron upper members 36 are connected one to each end portion in the vehicle width direction of a cowl 38 that extends in the vehicle width direction. This cowl 38 is provided at a boundary portion of the cabin 18 and the engine compartment 16.

Both end portions of the cowl 38 in the vehicle width direction are joined one to each of left and right front pillars 40. The left and right front pillars 40 each include a pillar lower 40A that extends in the vehicle vertical direction, and a pillar upper 40B that extends to the vehicle upper side and the vehicle rear side from an upper end portion of this pillar lower 40A. A rear end portion of the apron upper member 36 described above is connected to a connecting portion of the pillar lower 40A and the pillar upper 40B of each front pillar 40. Also, a front end portion of a rocker 42 that extends in the vehicle longitudinal direction is connected to a lower end portion of each pillar lower 40A. Also, a dash panel 46 that divides the cabin 18 from the engine compartment 16 is provided on a vehicle lower side of the cowl 38.

In the vehicle 12 having the structure described above, the side in front of the dash panel 46 is a crushable zone, such that when the vehicle 12 is involved in a frontal collision, the crush boxes 26 and the front side members 20 and the like actively deform, thereby absorbing energy, so that the cabin 18 to the rear side will not deform. This kind of structure is able to be realized by a well-known method such as forming a bead on the front side members 20.

Next, the main portion of this example embodiment will be described.

Figure 4:
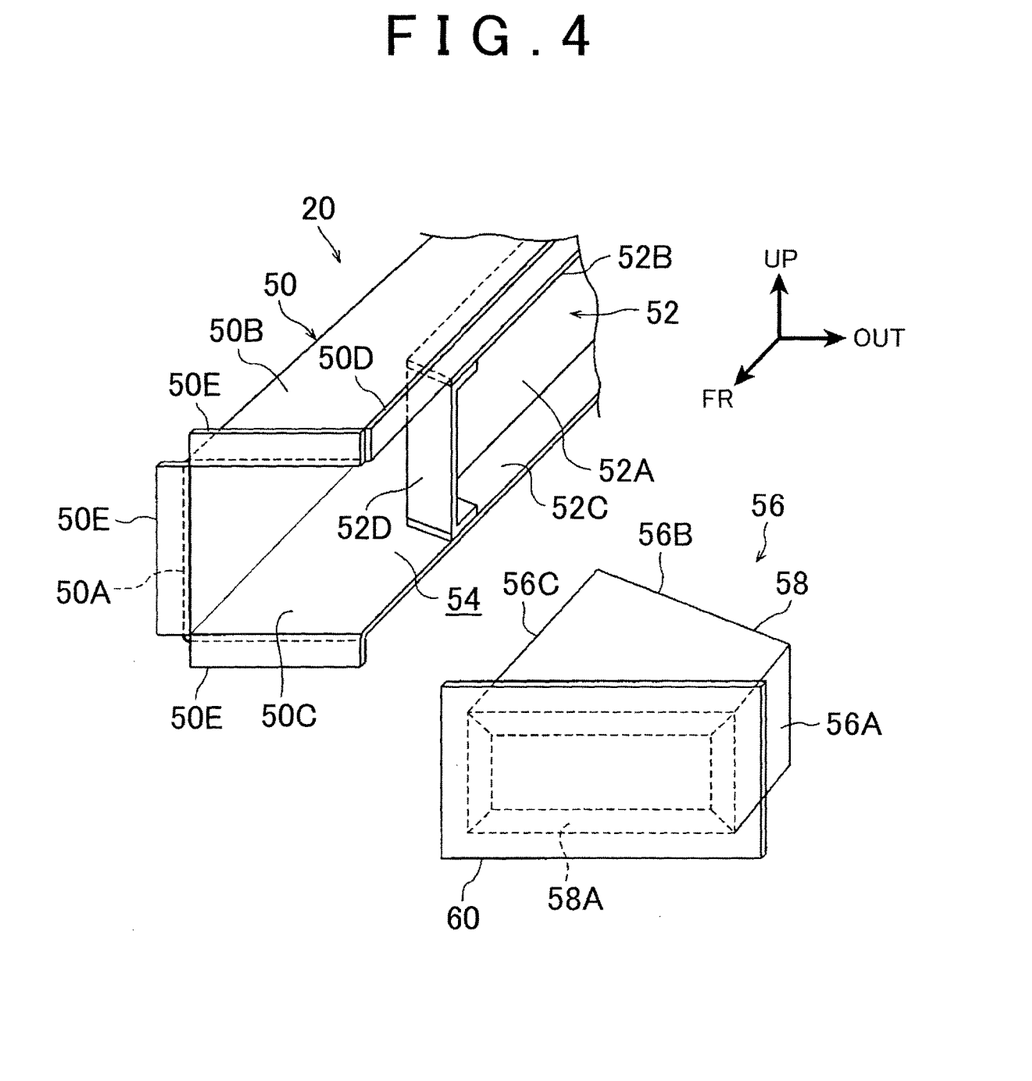
FIG. 4 is a perspective view of a front side member shown in FIG. 1 before a gusset is attached to a front portion thereof.

As shown in FIG. 4, in this example embodiment, each front side member 20 described above is formed by an inner panel 50 and an outer panel 52. The inner panel 50 is formed in an open sectional shape (a generally U-shaped cross-section) that is open to the vehicle width direction outside when viewed from the vehicle longitudinal direction. More specifically, the inner panel 50 includes an inner wall 50A that forms a side wall on the vehicle width direction inside of the front side member 20, an upper wall 50B and a lower wall 50C that extend toward the vehicle width direction outside from the vehicle upper and lower ends of the inner wall 50A, and an upper flange 50D (not shown in FIGS. 1, 2, and 6 to 8) that extends toward the vehicle upper side from a vehicle width direction outer end of the upper wall 50B.

The outer panel 52 includes an outer wall 52A that forms a side wall on the vehicle width direction outside of the front side member 20, and an upper flange 52B and a lower flange 52C that extend toward the vehicle width direction outside from the vehicle upper and lower ends of the outer wall 52A, respectively. The outer panel 52 is formed in an open sectional shape that is open toward the vehicle width direction outside when viewed from the vehicle longitudinal direction, similar to the inner panel 50. The dimension of this outer panel 52 in the vehicle width direction is set sufficiently smaller than that of the inner panel 50, and this outer panel 52 fits into the open portion of the inner panel 50. The upper flange 52B of the outer panel 52 is joined to the lower surface of the upper wall 50B of the inner panel 50, and the lower flange 52C of the outer panel 52 is joined to the upper surface of the lower wall 50C of the inner panel 50. The open portion of the inner panel 50 is closed off by this outer panel 52.

Figure 5:
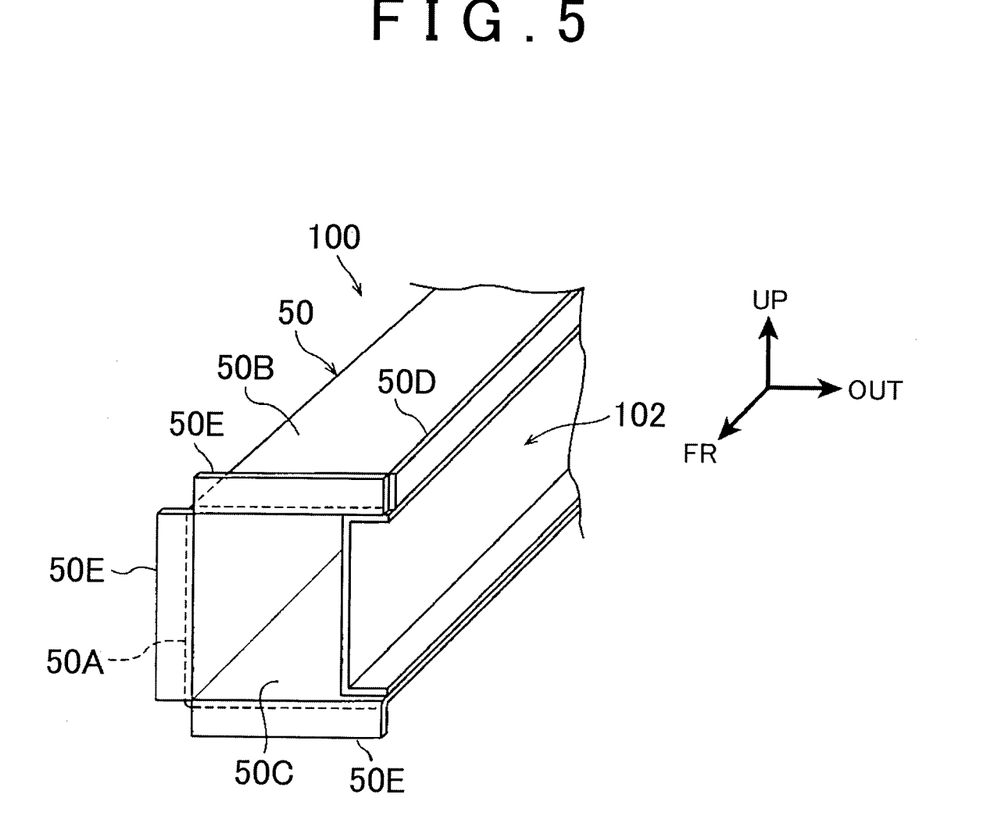
FIG. 5 is a perspective view corresponding to FIG. 4, of one example of a related front side member.

However, a front end portion of the outer panel 52 is set in a position farther to the rear in the vehicle longitudinal direction than a front end portion of the inner panel 50. Accordingly, an outside open portion 54 that is open toward the vehicle width direction outside is formed on a front portion of the front side member 20. FIG. 5 is a perspective view corresponding to FIG. 4, showing one example of a related front side member 100. The structure of this front side member 100 is similar to that of the front side member 20 except that the structure of a front portion of an outer panel 102 is different from the structure of the front portion of the outer panel 52.

Also, in this example embodiment, a gusset 56 (a load transmitting member) formed in a hollow box shape from a metal plate, such as a steel plate, is attached to the front portion of the front side member 20. This gusset 56 is formed by a box-shaped main body portion 58 that is open on the vehicle front side, and a rectangular flat plate-shaped front surface plate 60 that closes off the open portion of the main body portion 58. The main body portion 58 has a trapezoidal shape when viewed from above, and a rectangular shape when viewed in the vehicle longitudinal direction. Upper and lower left and right flanges 58A are provided on the open portion of this main body portion 58, and these flanges 58A are joined to a rear surface of the front surface plate 60. The projected area of this front surface plate 60 viewed from the vehicle longitudinal direction is set to be larger than that of the main body portion 58, such that an outer peripheral portion of the front surface plate 60 protrudes out from an outer peripheral portion of the main body portion 58.

This gusset 56 is fit inside a cross section of the front portion of the front side member 20 in a state in which a plate thickness direction of the front surface plate 60 follows the vehicle longitudinal direction. An outside protruding portion 56A that passes through the outside open portion 54 of the front side member 20 (from the outside open portion 54) and protrudes toward the vehicle width direction outside of the front side member 20 is provided on a vehicle width direction outside portion of this gusset 56. Also, a rear surface 56B of this gusset 56 is inclined toward the vehicle rear side farther toward the vehicle width direction inside. A vehicle width direction inside end portion of this rear surface 56B (i.e., a rear end portion of the gusset 56) is positioned farther to the vehicle rear side than the vehicle front side end portion 14A of the power unit 14, and farther to the vehicle front side than a generally center portion (the engine mount 24) of the power unit 14 in the vehicle longitudinal direction, when viewed from above.

A front end portion of the outer panel 52 of the front side member 20 abuts against the rear surface 56B of the gusset 56 from the vehicle rear side. A connecting flange 52D along the rear surface 56B is provided on a front end portion of this outer panel 52, and this connecting flange 52D is connected to the rear surface 56B by means such as spot welding. Also, a front flange 50E that protrudes toward the upper side, the lower side, and the vehicle width direction inside, is provided on a front end portion of the inner panel 50 of the front side member 20. This front flange 50E is connected to an outer peripheral portion of a rear surface of the front surface plate 60 by means such as spot welding.

Further, with this gusset 56, an inside fixed wall 56C (an inside fixed portion) that is a side wall on the vehicle width direction inside of the main body portion 58 is connected to the inner wall 50A of the inner panel 50 by means such as spot welding. Also, an upper surface and a lower surface of the main body portion 58 of this gusset 56 are connected to the upper wall 50B and the lower wall 50C, respectively, of the inner panel 50 by means such as spot welding. As a result, the gusset 56 is integrally fixed to the front portion of the front side member 20 while fitted inside a cross section of the front portion of the front side member 20.

The method by which the gusset 56 is fixed to the front side member 20 is not limited to bolt fastening. That is, any of various methods, such as welding, adhesion, and riveting and the like, may be used. Also, the gusset 56 is not limited to being formed in a hollow shape from a metal plate. That is, the gusset 56 may also be formed in a solid shape from metal material such as aluminum, or made of resin material.

A rear end surface of the crush box 26 (not shown in FIG. 4) abuts against a front end surface of the gusset 56. This crush box 26 is fastened to both the gusset 56 and the front side member 20 by means such as bolt fastening. The dimension in the vehicle width direction and the dimension in the vehicle vertical direction of this crush box 26 are both set equal to those of the main body portion 58 of the gusset 56. That is, this crush box 26 is provided with an outside extending portion 26A that extends toward the vehicle width direction outside corresponding to the outside protruding portion 56A of the gusset 56, and is fixed to a front surface of the outside protruding portion 56A.

Next, the operation and effects of this example embodiment will be described.

Figure 6:
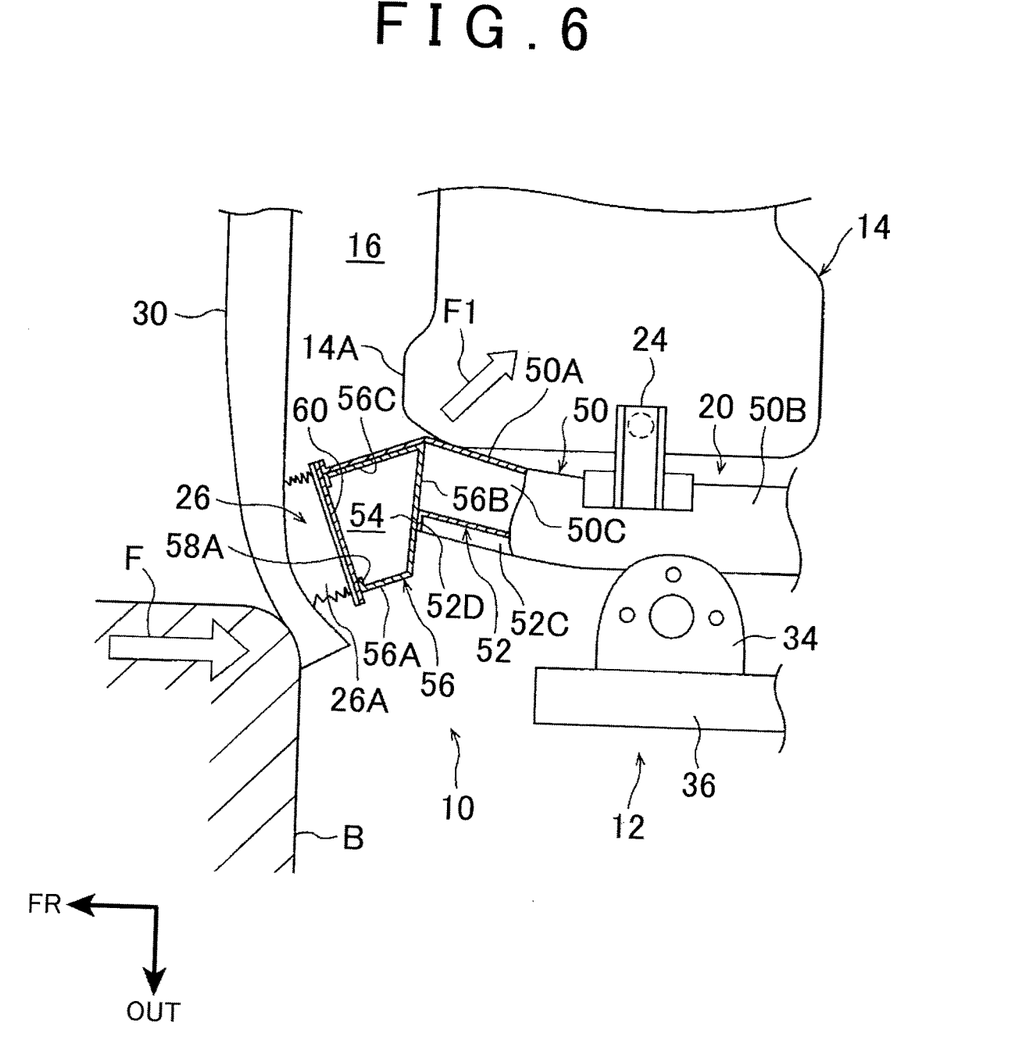
FIG. 6 is a partial sectional view corresponding to FIG. 2 illustrating a situation when a vehicle shown in FIG. 1 is involved in a small overlap collision.
Figure 7:
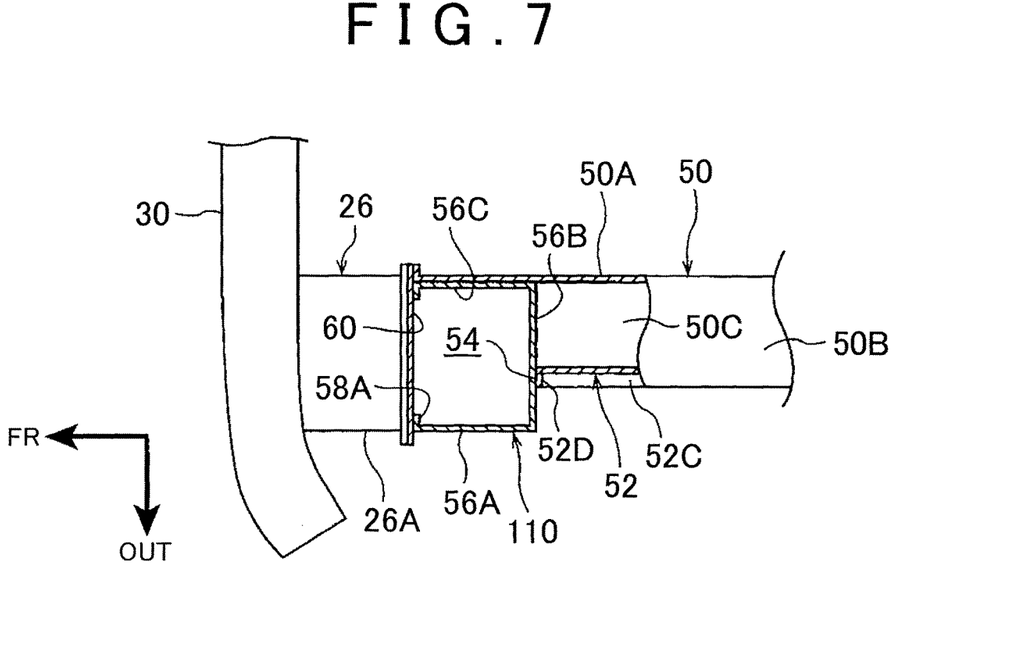
FIG. 7 is a partial sectional view corresponding to a portion of FIG. 2, showing a first modified example of the gusset.
Figure 8:
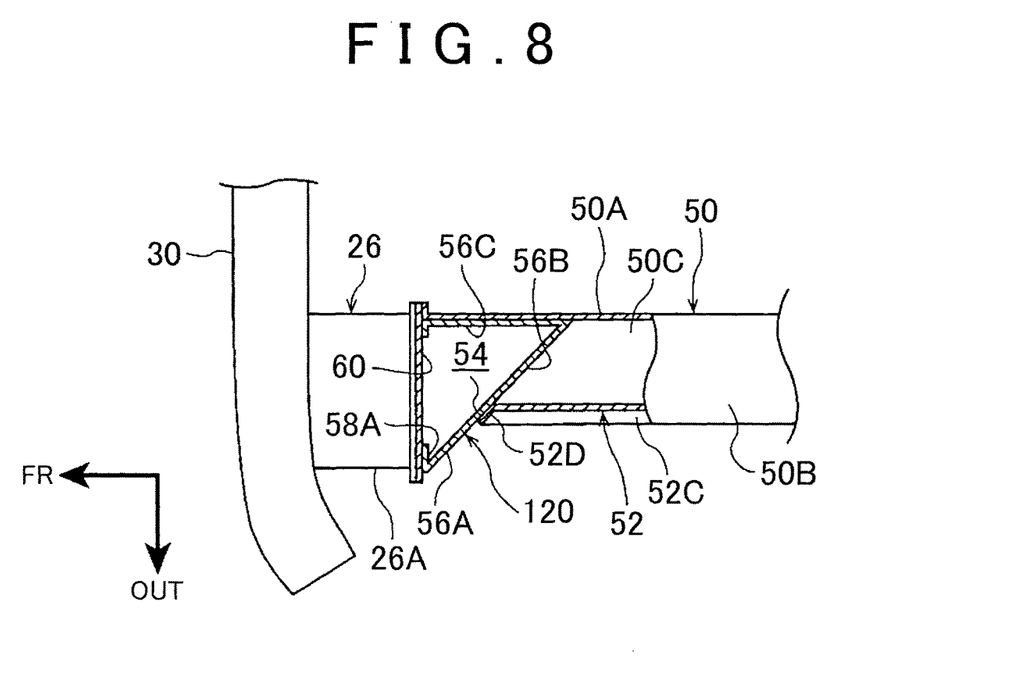
FIG. 8 is a partial sectional view corresponding to a portion of FIG. 2, showing a second modified example of the gusset.

With the vehicle body front structure 10 having the structure described above, when a portion of the vehicle 12 farther to the vehicle width direction outside than the front side member 20 collides in a frontal collision with a colliding object (here, barrier B) such as an oncoming vehicle (i.e., when a so-called small overlap collision occurs), the crush box 26 axial-compression in the vehicle longitudinal direction deforms due to the collision load F from the vehicle front side, as shown in FIG. 6. Also, at this time, the collision load F is input to the outside protruding portion 56A of the gusset 56.

This gusset 56 is fixed in a cross section of the front portion of the front side member 20, and the outside open portion 54 described above passes through the outside protruding portion 56A formed on the front portion of the front side member 20 and protrudes toward the vehicle width direction outside of the front side member 20. In this way, the gusset 56 is fixed in a cross section of the front side member 20, so the collision load F is able to be better transmitted to a vehicle width direction inside portion (here, the inner panel 50) of the front side member 20. Moreover, the rear surface 56B of this gusset 56 is connected to the front end portion of the outer panel 52 of the front side member 20, so the collision load F is also able to be better transmitted to a vehicle width direction outside portion of the front side member 20. As a result, with this example embodiment, the collision load F input from the vehicle front side to a portion of the vehicle body front portion that is farther to the vehicle width direction outside than the front side member 20 is able to be efficiently transmitted to the front side member 20.

Furthermore, in this example embodiment, the outside open portion 54 is formed on the front side member 20 by the front end portion of the outer panel 52 of the front side member 20 being positioned farther to the vehicle rear than the front end portion of the inner panel 50. Therefore, the front side member 20 having the outside open portion 54 formed on the front portion is able to be easily formed. Also, a conventional inner panel (see FIG. 5) can be used for the inner panel 50 of the front side member 20, so the manufacturing cost is able to be reduced, and productivity is able to be improved.

Moreover, in this example embodiment, the gusset 56 abuts against the outer wall 52A of the front side member 20 from the vehicle front side, and has the inside fixed wall 56C that is fixed to the inner wall 50A of the front side member 20. As a result, the collision load F that is input to the outside protruding portion 56A of the gusset 56 is able to be better transmitted to the wall portion on both sides in the vehicle width direction of the front side member 20, so the efficiency with which the collision load F is transmitted to the front side member 20 is able to be effectively improved.

Also, with this example embodiment, the outside protruding portion 56A of the gusset 56 is provided protruding toward the vehicle width direction outside from the front portion of the front side member 20, so when the collision load F from the vehicle front side is input to the outside protruding portion 56A, a bending moment will act on the front side member 20. As a result, as shown in FIG. 6, the front side member 20 is able to bend toward the vehicle width direction inside and abut against the power unit 14, so some of the collision load F is able to be distributed to the non-collision side of the vehicle body via the power unit 14 (see arrow F1 in FIG. 4).

Moreover, the rear surface 56B of the gusset 56 that is fixed to the inner wall 50A of the front side member 20 is inclined toward the vehicle body rear side farther toward the vehicle width direction inside, so the gusset 56 is able to be inhibited from becoming larger even if the rear end of the gusset 56, which is where the front side member 20 starts to bend, is arranged to the side of the power unit 14.

Further, reaction force from the power unit 14 is able to act on the barrier B by the front side member 20 abutting against the power unit 14 as described above. As a result, force in the lateral direction (i.e., the vehicle width direction) that is input from the barrier B to the vehicle body front portion of the vehicle 12 is able to be increased, so the vehicle body front portion of the vehicle 12 is able to separate from the barrier B in the lateral direction by the force in the lateral direction. As a result, the collision load F that is input to the vehicle body front portion from the barrier B is able to be effectively reduced, so deformation of the cabin 18 is able to be significantly inhibited.

Also, in this example embodiment, the crush box 26 that connects the front side member 20 to the bumper reinforcement 30 has the outside extending portion 26A positioned in front of the outside protruding portion 56A of the gusset 56 in the vehicle longitudinal direction. That is, the crush box 26 extends toward the vehicle width direction outside, so when the collision load F from the vehicle front side is input to a portion of the bumper reinforcement 30 that is farther to the vehicle width direction outside than the front side member 20, the impact energy is able to be effectively absorbed by the deformation of the crush box 26. Also, the collision load is able to be efficiently transmitted to the outside protruding portion 56A of the gusset 56 via the outside extending portion 26A of the crush box 26.

In the example embodiment described above, the gusset 56 is formed in a trapezoidal shape when viewed from above, but the invention is not limited to this. That is, the shape of the gusset 56 may be modified as appropriate. For example, the gusset may be formed in a rectangular shape when viewed form above, like a gusset 110 (a first modified example) shown in FIG. 7. This gusset 110 is similar to the gusset 56 except that the main body portion 58 is formed in a rectangular shape when viewed from above. Also, for example, the gusset may be formed in a triangular shape when viewed from above, like a gusset 120 (a second modified example) shown in FIG. 8. This gusset 120 is similar to the gusset 56 except that the main body portion 58 is formed in a triangular shape when viewed from above.

Also, in the example embodiment described above, the crush box 26 that serves as an impact absorbing member is fixed to the front end portion of the front side member 20, but the invention is not limited to this. That is, an impact absorbing member may also be integrally provided on the front portion of the front side member. In this case, the gusset is fixed to a portion of the front side member that is farther toward the vehicle rear side than the impact absorbing portion.

Also, in the example embodiment described above, the crush box 26 is provided with the outside extending portion 26A, but the invention is not limited to this. That is, the outside extending portion 26A may be omitted, and a space may be formed between the bumper reinforcement 30 and outside protruding portion 56A of the gusset 56. In this case, for example, a vehicle width direction outside end portion of the bumper reinforcement 30 that bends toward the vehicle rear side from the collision load F abuts against the outside protruding portion 56A of the gusset 56.

Also, in the example embodiment described above, the gusset 56 has an inside fixed wall 56C that is fixed to the inner wall 50A of the front side member 20, but the invention is not limited to this. That is, the gusset 56 may also be arranged away from the inner wall 50A. In this case as well, the efficiency with which the collision load F is transmitted to the front side member 20 via the gusset 56 is able to be improved by the gusset 56 being fixed to the upper wall 50B and the lower wall 50C of the inner panel 50.

Also, in the example embodiment described above, the outside open portion 54 is formed by the front end portion of the outer panel 52 of the front side member 20 being positioned farther to the vehicle rear than the front end portion of the inner panel 50, but the invention is not limited to this. For example, in the front side member 100 shown in FIG. 5, a through-hole may be formed in the front portion of the outer panel 52, and this through-hole may serve as the outside open portion.

In addition, the invention may be modified without departing from the scope thereof. Also, the scope of the invention is not limited by the example embodiments described above.

The invention claimed is:

1. A vehicle body front structure of a vehicle comprising:
a front side member that extends in a vehicle longitudinal direction on a side portion of a vehicle body front portion, and an outside open portion that is open outward from a center of the vehicle in a vehicle width direction is formed on a front portion of the front side member;
a load transmitting member that is fixed in an interior of the front portion of the front side member, and the load transmitting member includes an outside protruding portion that passes through the outside open portion and protrudes toward the vehicle width direction, the load transmitting member abutting against a first side wall of the front side member from a vehicle front side;
a bumper reinforcement that extends in the vehicle width direction on a front end portion of a vehicle body of the vehicle; and
a crush box that is formed weaker in the vehicle longitudinal direction than the front side member, and connects the front side member to the bumper reinforcement, and on which an outside extending portion that is positioned in front of the outside protruding portion in the vehicle longitudinal direction is provided.

2. The vehicle body front structure according to claim 1, wherein
the front side member includes an inner panel with an open sectional shape that is open outward from the center of the vehicle in the vehicle width direction when viewed from the vehicle longitudinal direction, and the front side member includes an outer panel that is connected to the inner panel; and
the outside open portion is formed by a front end portion of the outer panel being positioned farther to a vehicle rear than a front end portion of the inner panel, and the front end portion of the outer panel abuts against a rear surface of the load transmitting member that is fixed in the interior of the inner panel.

3. The vehicle body front structure according to claim 1, wherein
the load transmitting member has an inside fixed portion that is fixed to a second side wall of the front side member.

4. The vehicle body front structure according to claim 1, wherein
a rear surface of the load transmitting member is inclined a vehicle rear side of the vehicle farther toward the center of the vehicle in the vehicle width direction.

5. The vehicle body front structure according to claim 2, wherein
the load transmitting member is fixed to a second side wall of the front side member, or to an upper wall and a lower wall of the inner panel.

6. The vehicle body front structure according to claim 1, wherein the first side wall of the front side member is farther away from the center of the vehicle in the vehicle width direction than a second side wall of the front side member.

7. The vehicle body front structure according to claim 5, wherein the first side wall of the front side member is farther away from the center of the vehicle in the vehicle width direction than the second side wall of the front side member.

* * * * *